United States Patent
Rajana et al.

(10) Patent No.: US 11,580,585 B1
(45) Date of Patent: Feb. 14, 2023

(54) USER-PREFERRED ITEM ATTRIBUTES

(71) Applicant: Amazon Technologies, Inc., Seattle, WA (US)

(72) Inventors: Sneha Rajana, Seattle, WA (US); Ben Allison, Edinburgh (GB); Xiaonan Zhao, Seattle, WA (US); Pranav Varia, Bothell, WA (US); Sungro Yoon, Redmond, WA (US); Charles Lawrence Scott, Seattle, WA (US); Daniel Lloyd, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 201 days.

(21) Appl. No.: 16/915,201

(22) Filed: Jun. 29, 2020

(51) Int. Cl.
 *G06Q 30/00* (2012.01)
 *G06Q 30/0601* (2023.01)
 *G06Q 30/0202* (2023.01)

(52) U.S. Cl.
 CPC ..... *G06Q 30/0631* (2013.01); *G06Q 30/0202* (2013.01); *G06Q 30/0627* (2013.01); *G06Q 30/0641* (2013.01)

(58) Field of Classification Search
 CPC .................................................. G06Q 30/00
 See application file for complete search history.

(56) References Cited

U.S. PATENT DOCUMENTS

| 8,185,526 | B2 | 5/2012 | Wen et al. | |
|---|---|---|---|---|
| 10,599,293 | B1* | 3/2020 | Olcott | G06F 3/0482 |
| 11,030,574 | B1* | 6/2021 | Grande | G06N 20/00 |
| 2014/0058899 | A1* | 2/2014 | Fellinger | G06Q 30/0623 |
| | | | | 705/26.61 |
| 2015/0332479 | A1* | 11/2015 | Gershon | G06Q 30/0627 |
| | | | | 382/164 |
| 2015/0339759 | A1* | 11/2015 | Pope | G06Q 30/0631 |
| | | | | 705/26.62 |
| 2019/0172122 | A1* | 6/2019 | Wenger | G06Q 30/0633 |
| 2020/0090251 | A1* | 3/2020 | Desrosiers | G06Q 30/0633 |
| 2021/0319492 | A1* | 10/2021 | Jeong | G06Q 30/0631 |

OTHER PUBLICATIONS

Moran, Kate, "Defining Helpful Filter Categories and Values for Better UX", Nielsen Norman Group, dated Jul. 15, 2018. (Year: 2018).*
UX Blog, "How to create a great faceted search and navigation experience", Algolia.com, dated Mar. 9, 2000. (Year: 2000).*
Green et al., "USING cognitive walkthrough to improve the design of a virtual programming experiment", Oregon State University, dated: Circa 1996. (Year: 1996).*

* cited by examiner

*Primary Examiner* — Mark A Fadok
(74) *Attorney, Agent, or Firm* — Thomas | Horstemeyer, LLP

(57) ABSTRACT

Disclosed are one or more embodiments for a unique and personalized experience for a user interacting with an electronic commerce site by identifying user-preferred item attributes using supervised machine learning and presenting items to the user in an arrangement that is based on the identified item attributes. A shopping mission is determined according to user interactions with an electronic commerce site. The shopping mission is applied to an attribute prediction model that is trained to detect user-preferred item attributes for items included the item category and estimate a likelihood that an item containing a particular attribute will be purchased or interacted with during the interactions with the electronic commerce site.

20 Claims, 6 Drawing Sheets

USER-PREFERRED ITEM ATTRIBUTES

BACKGROUND

An electronic commerce system includes listings of items (e.g., products, goods, services, digital content, etc.) offered for sale, lease, download, rent, etc., by many different merchants. Users may use the electronic commerce system to purchase, lease, download, rent, etc., items of interest. In some instances, as a user navigates through different network pages of the electronic commerce system, the user may interact with items having similar features or attributes.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
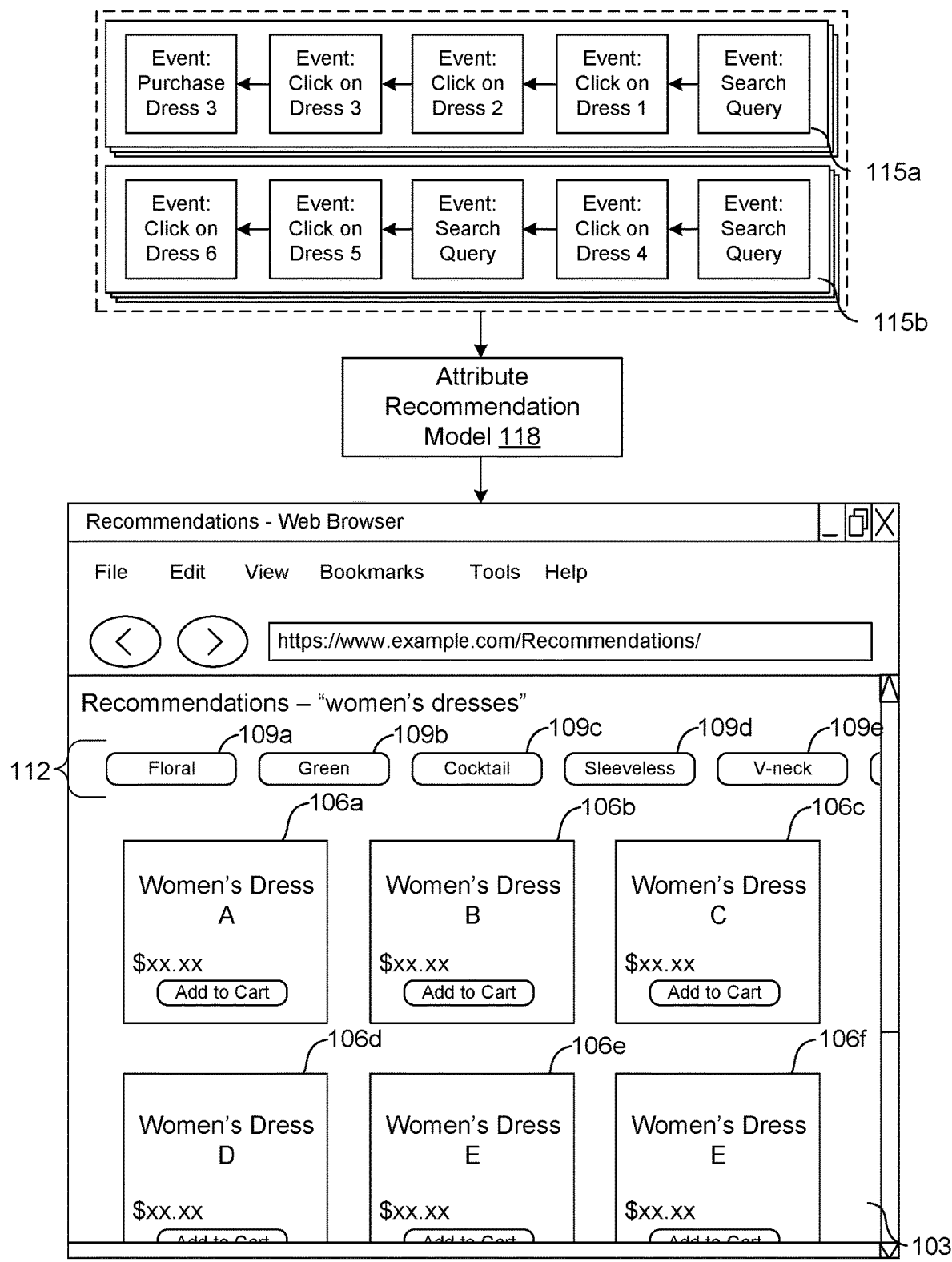
FIG. 1 is a drawing of an example user interface including a listing of user-preferred item attributes and item listings arranged according to the user-preferred item attributes according to one or more embodiments of the present disclosure.

The present disclosure relates to providing a unique and personalized experience for a user interacting with an electronic commerce site. The experience is provided by identifying user-preferred item attributes for items without any user-defined input explicitly identifying the attributes (e.g., a term included in a search query) and presenting items to the user in an arrangement that is based on the identified item attributes. The item attributes correspond to specific characteristics that define a given item such as, for example, size, color, style, material, pattern, brand, care requirements, age-group, fragility, location of manufacture, and/or other attributes of an item as can be appreciated.

As a user interacts with the electronic commerce site with respect to available items included in the particular item category, the user is presented with a user interface that includes refinement components associated with the user-preferred item attributes along with a listing of items available via the electronic commerce site that are presented in an order according to the user-preferred item attributes. As such, the user refines the presented items by selecting one or more of the refinement components that correspond to an identified preferred item attribute.

According to various embodiments, the user-preferred item attributes are determined using an attribute prediction model that is trained using data associated with shopping missions of users interacting with the electronic commerce site. A shopping mission is a sequence of interaction events (e.g., item views, item searches, item purchases, item clicks, etc.) that are clustered for a given item category. For example, a shopping mission for "running shoes" may include the following events: (1) a search query for "running shoes"; (2) a selection of a particular running shoe item in a listing of items presented in a search results; (3) a selection of another running shoe item recommended as a similar item of the particular running shoe item in an item detail page of the particular running shoe item; and (4) a purchase of the other running shoe item. Indeed, these events are all related to the item category for "running shoes." A shopping mission is categorized as being a complete shopping mission or an incomplete shopping mission. A complete shopping mission is a shopping mission that results in a purchase of an item, whereas an incomplete shopping mission is a shopping mission that does not include a purchase of an item.

Each shopping mission includes one or more event features that are used for (1) training the attribute prediction model for the given category and/or (2) applying to a pre-trained attribute prediction model in order to determine user-preferred item attributes. The event features include, for example, a search query event, a number of events in a given shopping mission, an item selection event, an item purchase event, an elapsed time associated with the shopping mission, a mission type (e.g., complete or incomplete), an item category, one or more attributes extracted from a search query (e.g., "red" and "running" from search for "red running shoes"), one or more item attributes, and/or other types of features. In some examples, the event features are used to derive additional features for training the attribute prediction model for the given category. For example, the derived features include an identification of events within shopping missions with multiple item views, item title attributes of items within one or more complete or incomplete shopping missions, search attributes of search queries within one or more complete or incomplete shopping missions, an item category associated with the mission, and/or other features.

According to various embodiments, as a user interacts with an electronic commerce site, a current shopping mission is determined. For example, assume that the current shopping mission corresponds to user interactions with items related to dining room tables and the shopping mission is determined according to interaction events associated with dining room tables. The event features for the current shopping mission and, if available, other shopping missions associated with the item category and the user account, are applied to an attribute prediction model trained for the item category associated with the current shopping mission. In some examples, the attribute prediction model is trained for just the item category. In other examples, the attribute prediction model is trained for multiple item categories.

The attribute prediction model generates item attributes that are determined to be of interest or preferred by the user interacting with the electronic commerce application. In addition, for each item attribute, the attribute prediction model estimates a likelihood that a user will purchase and/or click on an item containing the item attribute during the current shopping mission. According to various embodiments, the item attributes provided by the attribute prediction model are ranked according to the estimated likelihood.

Further expanding on the example of the dining room table, the analysis of the shopping mission(s) via the attribute prediction model may determine that the user appears to prefer dining room tables having a pedestal base. As such, one of the item attributes generated from the attribute prediction model will likely include "pedestal base" or another related synonym. Further, as the user continues to navigate through one or more user interfaces associated with the electronic commerce site during the shopping mission, the user interfaces presented to the user may include a listing of items associated with the interactions of the shopping mission as well as selectable refinement components that correspond to the identified preferred item attributes. As such, when a user selects a selectable refinement components corresponding to an attribute of interest, the presented items are further refined according to the corresponding attribute determined to be preferred by the user.

Turning now to FIG. 1, shown is an example user interface 103 that includes item listings 106 (e.g., 106a, 106b, 106c, 106d, 106e, 106f) associated with recommendations for "women's dresses." In addition, the user interface 103 includes selectable refinement components 109 (e.g., 109a, 109b, 109c, 109d, 109e) for user-preferred attributes 112 that have been determined to be preferred by the user or user account associated with the active interaction session without any prior user input indicating a preference for one or more of the user-preferred attributes 112.

According to various embodiments of the present disclosure, the user-preferred attributes 112 are determined using one or more shopping missions 115 (e.g., 115a, 115b) associated with interactions with the electronic commerce site. The one or more shopping missions 115 include complete shopping missions 115a and/or incomplete shopping missions 115b. In some examples, the user interacting with the electronic commerce site is associated with a user account with the electronic commerce site. In this example, previous shopping missions 115 corresponding to the item category and user account are obtained, if available, according to interaction history data associated with the user account. As such, in some examples, these shopping missions 115 are considered in determining user-preferred attributes 112. In other examples, only the current shopping mission 115 associated with the real-time user interactions is considered for determining the user-preferred attributes 112. For example, the user interacting with the electronic commerce site may not have a user account with the electronic commerce site and/or no prior interaction history data associated with the item category.

The event features of the shopping mission(s) 115 are extracted from the shopping mission 115 and applied to an attribute prediction model 118 that is trained for the item category associated with the shopping mission(s) 115. According to one or more examples, the event features included in the shopping mission(s) 115 include, for example, a search query event, a number of events in a given shopping mission, an item selection event, an item purchase event, an elapsed time associated with the shopping mission, a mission type (e.g., complete or incomplete), an item category, one or more attributes extracted from a search query (e.g., "floral" and "green" from search for "floral green dress"), one or more item attributes, and/or other types of features.

The attribute prediction model 118 outputs the user-preferred attributes 112 associated with the applied shopping missions. In this example, the user-preferred attributes 112 include "floral," "green," "cocktail," "sleeveless," and "v-neck." As the shopping mission 115 evolves through additional interactions with the electronic commerce site (e.g., searches, views, clicks, etc.), the user-preferred attributes 112 may change, thereby affecting selection and arrangement of the item listings and user-preferred item attributes 112 presented to the user.

According to various embodiments, the selectable refinement components 109 are arranged in a presentation order that is based on a ranking of the user-preferred item attributes 112 with respect to an estimated likelihood that that the user will purchase an item having the particular user-preferred item attribute 112. For example, in the user interface 103 of FIG. 1, the first selectable refinement component 109a corresponds to a user-preferred item attribute 112 for "floral." In this example, the likelihood of the user purchasing an item having an item attribute of "floral" appears to be greater than the likelihood of the user purchasing an item having an item attribute 112 of "plain," which is not even provided as an option in the listing of user-preferred item attributes 112. In addition, the item attribute of "floral" appears to have a greater estimated likelihood of being in an item purchased than the item attributes of "green," "cocktail," "sleeveless," or "v-neck" according to the arranged order of selectable refinement components 109. In some examples, a user may be unaware of a particular user-preferred item attribute 112 and the presentation of the user-preferred attributes 112 is used to highlight a particular attribute 112 that the user otherwise would not have considered.

When a user selects a particular selectable refinement component 109, the user interface 103 is updated to refine the item listings 106 according to the user-preferred attribute 112 associated with the particular selectable refinement component 109. For example, if a user were to select the selectable refinement component 109c associated with "cocktail," the user interface 103 is be updated to present only the item listings 106 for items including the item attribute of "cocktail." In some examples, the items refined according to the selection of the selectable refinement component may not include items that match one or more of selected refinement attributes. For example, if the user had previously selected "green" and "v-neck," and there is not a dress that is green, v-neck, and cocktail, the subset of items may include items that include attributes similar to "green" "v-neck" and/or "cocktail" (e.g., turquoise, teal, square neck, low cut, etc.). In addition, in some examples, the item listings 106 include a notification indicating that the item is not an exact match to the requested refinement when some of the selected items fail to match all requested attributes.

According to various embodiments, the item listings 106 are selected and arranged according to the user-preferred item attributes 112. In one or more examples, the items returned in response to the search query are be ranked according to whether the items associated with the item listings 106 include one or more of the user-preferred item attributes 112 and then arranged in the user interface 103 according to the ranking. For example, assume the item associated with item listing 106a (e.g., Women's Dress A) includes the user-preferred item attributes 112 of "floral," "green," "cocktail," and "sleeveless," while the item associated with the item listing 106e (e.g., Women's Dress E) only includes the user-preferred item attributes 112 of "green," "cocktail," and "v-neck." As such, the item listing 106a for Women's Dress A will be ranked higher than the item listing 106e for Women's Dress E.

As one skilled in the art will appreciate in light of this disclosure, certain embodiments are capable of achieving certain advantages, including some or all of the following: (1) reducing computer resource utilization (e.g., memory consumption, processor utilization, network transfer, etc.) by avoiding the need to individually search an online catalog for items of interests; (2) reducing the number of labels required for training data and automatically creating large amounts of training data, thereby eliminating the need for human labelling for training the attribute prediction models: (3) improving the user experience in interacting with a computer system by automatically identifying preferred items of interest to the user, so the user does not waste his or her time ending up at dead-ends without finding desired items; (4) improving the functioning of the computing system through a more streamlined presentation process that reduces user frustration when searching for other items; (5) improving the user experience in interacting with a computer system by providing a dynamically generated user interface with a unique layout tailored to the interests of the user to allow the user to easily access relevant items for a given context; and so forth. In the following discussion, a general description of the system and its components is provided, followed by a discussion of the operation of the same.

Figure 2:
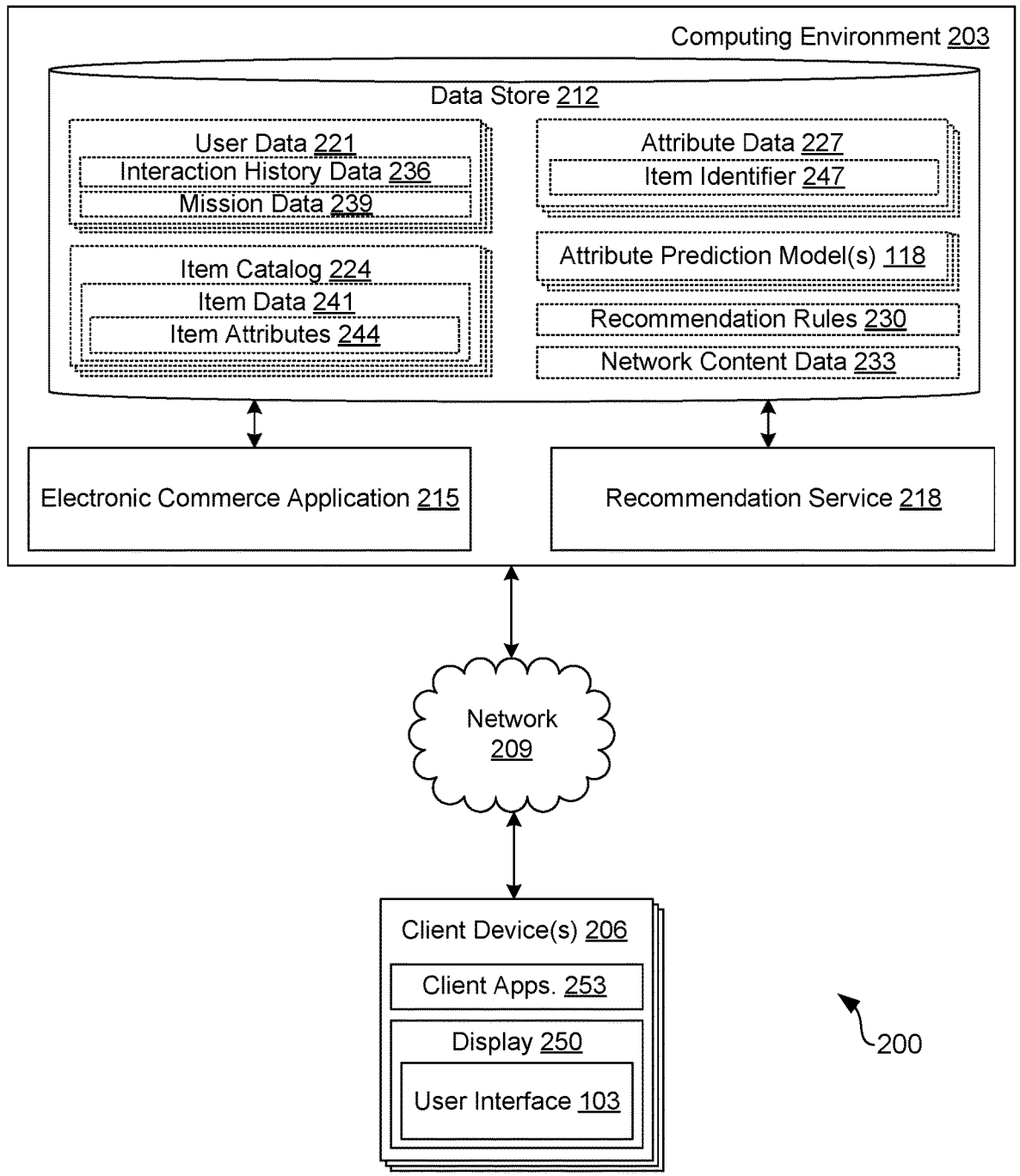
FIG. 2 is a schematic block diagram of a networked environment according to one or more embodiments of the present disclosure.

With reference to FIG. 2, shown is a networked environment 200 according to one or more embodiments. The networked environment 200 includes a computing environment 203 and one or more client devices 206, which are in data communication with each other via a network 209. The network 212 includes, for example, the Internet, intranets, extranets, wide area networks (WANs), local area networks (LANs), wired networks, wireless networks, cable networks, satellite networks, or other suitable networks, etc., or any combination of two or more such networks.

According to one or more embodiments, the computing environment 203 comprises, for example, a server computer or any other system providing computing capability. In other embodiments, the computing environment 203 employs a plurality of computing devices that are arranged, for example, in one or more server banks or computer banks or other arrangements. Such computing devices are located in a single installation or distributed among many different geographical locations. For example, in some embodiments, the computing environment 203 includes a plurality of computing devices that together comprise a hosted computing resource, a grid computing resource, and/or any other distributed computing arrangement. In some cases, the computing environment 203 corresponds to an elastic computing resource where the allotted capacity of processing, network, storage, or other computing-related resources vary over time.

In some embodiments, one or more applications and/or other functionality are executed in the computing environment 203. Also, data is stored in a data store 212 that is accessible to the computing environment 203. In one or more embodiments, the data store 212 is representative of a plurality of data stores 212 as can be appreciated. The data stored in the data store 212, for example, is associated with the operation of the one or more applications and/or functional entities described below.

The components executed on the computing environment 203, for example, include an electronic commerce application 215, a recommendation service 218, and other applications, services, processes, systems, engines, or functionality not discussed in detail herein. The electronic commerce application 215 is executed to is executed to facilitate the online sale, download, lease, rent, etc. of items from one or more electronic commerce systems over the network 209. Such items include, for example, products, goods, services, digital content, and/or other items. The electronic commerce application 215 also performs various backend functions associated with the online presence of an electronic commerce system in order to facilitate the online purchase of items. For example, the electronic commerce application 215 generates network pages such as, for example, web pages and/or other types of network content that are provided to client devices 206 for the purposes of promoting and selecting items for purchase, rental, download, lease, or any other forms of consumption.

The recommendation service 218 is executed to detect user-preferred item attributes 112 and recommend available items and attributes to a user associated with a client device 206 interacting with the electronic commerce application 215. In particular, the recommendation service 218 identifies an item category associated with a current shopping mission 115 and applies the event features associated with the current shopping mission 115 and/or any prior shopping missions 115 corresponding to the item category to an attribute prediction model 118 trained for at least one item category. According to various embodiments, the recommendation service 218 ranks the user-preferred attributes 112 according to an estimated likelihood that a user will purchase and/or interact with an item including the given attribute 112 during future events of the current shopping mission 115.

The recommendation service 218 further obtains item recommendations from an item recommendation pool (e.g., search results in response to a search query, a listing of recommended items of an item presented in an item detail page, a webpage request for a webpage associated with the electronic commerce site that includes one or more recommended items, a home page, an order summary page, etc.) and ranks items according to whether the items include any one of the user-preferred attributes 112 provided from the attribute prediction model 118. The recommendation service 218 interacts with the electronic commerce system 215 to provide a listing of the ranked user-preferred attributes 112 and corresponding item listings 109 to present to the user for a given interaction session. In some examples, the recommendation service 218 is incorporated within the electronic commerce application 215. In other examples, the recommendation service 218 is a standalone application.

The data stored in the data store 212 includes, for example, user data 221, an item catalog 224, attribute data 227, attribute prediction model(s) 118, recommendation rules 230, and network content data 233, and potentially other data. The user data 221 includes various data collected from or generated by users and/or customers having accounts in an electronic commerce site facilitated by the electronic commerce application 215. The user data 221 includes interaction history data 236, mission data 239, account address(es), payment instrument data, authentication information, and/or other data associated with a user or user account of the electronic commerce site. In some examples, a user account is shared by multiple users and the user data 221 includes data for each user associated with the user account.

The interaction history data 236 includes information specific to a user account, such as, for example, a purchase history (including purchase frequency, purchase cadence, purchase recency, etc.), a browsing history, a viewing history, a rating history, a search history, and/or other information that reflects a prior interaction by the user account with the computing environment 203. The mission data 239 includes data corresponding to shopping missions 115. In particular, the mission data 239 includes the event features associated with shopping missions 115 that are clustered according to interactions with items included in the same item category. The event features include, for example, one or more search query events, one or more item selection events, one or more item purchase events, an elapsed time associated with the shopping mission, a mission type (e.g., complete or incomplete), an item category, one or more attributes extracted from a search query, one or more item attributes, and/or other types of features.

The item catalog 224 includes item data 241 regarding items offered through the electronic commerce application 215. In various embodiments, such items include products, goods, services, digital content, and/or other items that can be offered for sale, lease, rent, download, etc. In one or more embodiments, the items in the item catalog 224 are organized according to a taxonomy of categories. For example, the items in the item catalog 224 are categorized according to an item type with various item attributes further defining a placement of an item in the taxonomy. For example, dining room tables and end tables include two branches of the taxonomy under a category for "tables." Further, the category associated with dining room tables, for example, include branches according to one or more associated attributes (e.g., modern, antique, etc.).

The item data 241 includes item attributes 244, an item identifier 247, descriptions, weights, prices, quantities available, export restrictions, customer reviews, customer ratings, images, videos, version information, availability information, shipping information, and/or other data. Item attributes 244 include specific characteristics that define a given item. For example, item attributes include size, color, style, material, pattern, brand, care requirements, age-group, fragility, location of manufacture, and/or other attributes as can be appreciated. In some embodiments, the item attributes 244 can be extracted from item titles, item descriptions, item reviews, and/or other information that may provide defining characteristics about a given item.

The attribute data 227 includes a mapping of item attributes 244 to items included in the item catalog 224. For example, the attribute data 227 corresponding to the attribute of "teak" includes a mapping to a listing of item identifiers 247 for items that include the item attribute 244 of "teak."

The attribute prediction model(s) 118 include supervised learning models trained to detect attribute preferences based at least in part on mission data 239 up to a point in time for one or more given item categories. In some examples, an attribute prediction model 118 is trained for a given item category within the item catalog 224. In other examples, an attribute prediction model 118 is trained for multiple item categories within the item catalog 224. According to various embodiments, classifiers are learned to predict the probability of a purchase of or interaction (e.g., click) with an item listing 106 in future interaction events of a current shopping mission 115. The attribute prediction model 118 ranks the attributes by the predicted probabilities for each attribute label in the attribute vocabulary for the said item type, represented by an item catalog 224 and item category combination.

According to various embodiments, the attribute, prediction model(s) 118 is trained using mission data 239 associated with the given item category and collected from multiple user interactions with the electronic commerce application 215. In some examples; the item category for a particular shopping mission is used as an input for training a given attribute prediction model 118. In this case, the shopping missions used to train a given attribute prediction model 118 are not required to be of the same item category. In a situation where an attribute prediction model 118 is trained for multiple item categories, the training considers the different item categories associated with the different shopping missions.

In some examples, the attribute prediction model is trained for each item category, accordingly. In other examples, the attribute prediction model is trained for multiple categories included in the shopping missions such that the output of the attribute prediction model 118 (e.g., user-preferred attributes) corresponds to multiple categories. For example, assume that a particular shopping mission corresponds to a user shopping for items to re-decorate his or her office. In the example where the attribute prediction model 118 is trained for multiple categories, the output of the attribute prediction model 118 can be for multiple categories and include user-preferred attribute 115 for office items such as, for example, chairs, desks, tables, etc. In various embodiments, the attribute prediction models 118 is updated periodically, randomly, upon identification of outdated mission data 239, and/or updated according other relevant factors.

In one or more embodiments, the attribute prediction model(s) 118 includes, for example, a logistic regression classifier, a random forest classifier, a decision tree classifier, a XGBoost classifier, a multi-layer perceptron classifier, a recurrent neural network, a feed-forward neural network, a label-specific attention network, and/or any other type of trained model as can be appreciated.

The recommendation rules 230 include rules, models, and/or configuration data for the various algorithms or approaches employed by the recommendation service 218. In one or more examples, the recommendation rules 230 includes the various models and/or algorithms for ranking and determining an order of presentation for the user-preferred item attributes 112 and/or item listings 106 to be included in a user interface. In some examples, the recommendation rules 230 are used to generate scores for item listings 106 to present to the user according to the user-preferred item attributes 112. In some embodiments, the recommendation rules 230 are used to generate scores for the different item listings 106 according to whether the associated items include any one of the user-preferred item attributes 112. In this example, the calculated scores are ranked and used to determine an order of presentation of the item listings 106 included in a given user interface 103.

The network content data 233 includes various data employed by the electronic commerce application 215 in generating user interfaces 103, and/or other network pages. In some embodiments, the network content data 233 includes hypertext markup language (HTML), extensible markup language (XML), cascading style sheets (CSS), images, text, audio, video, templates, and/or other data.

The client devices 206 are representative of a plurality of client devices that are in communication with the network 209. In some embodiments, the client device 206 comprises, for example, a processor-based system such as a computer system. In one or more embodiments, such a computer system is embodied in the form of a desktop computer, a laptop computer, a personal digital assistant, a cellular telephone, a smartphone, a set-top box, a music player, a web pad, a tablet computer system, a game console, an electronic book reader, a smartwatch, a head mounted display, a voice interface device, or other device. In some embodiments, the client device 206 includes a display 250. In one or more embodiments, the display 250 comprises, for example, one or more devices such as liquid crystal display (LCD) displays, gas plasma-based flat panel displays, organic light emitting diode (OLED) displays, electrophoretic ink (E ink) displays, LCD projectors, or other types of display devices, etc.

The client device 206 is configured to execute one or more applications such as a client application 253 and/or other applications. In one or more examples, the client application 253 is executed in a client device 206, for example, to access network content served up by the computing environment 203 and/or other servers, thereby rendering a user interface 103 on the display 250. To this end, the client application 253 comprises, for example, a browser, a dedicated application, etc., and the user interface 103 comprises a network page, an application screen, etc. In one or more examples, the client device 206 is configured to execute applications beyond the client application 253 such as, for example, email applications, social networking applications, word processors, spreadsheets, and/or other applications.

Figure 3:
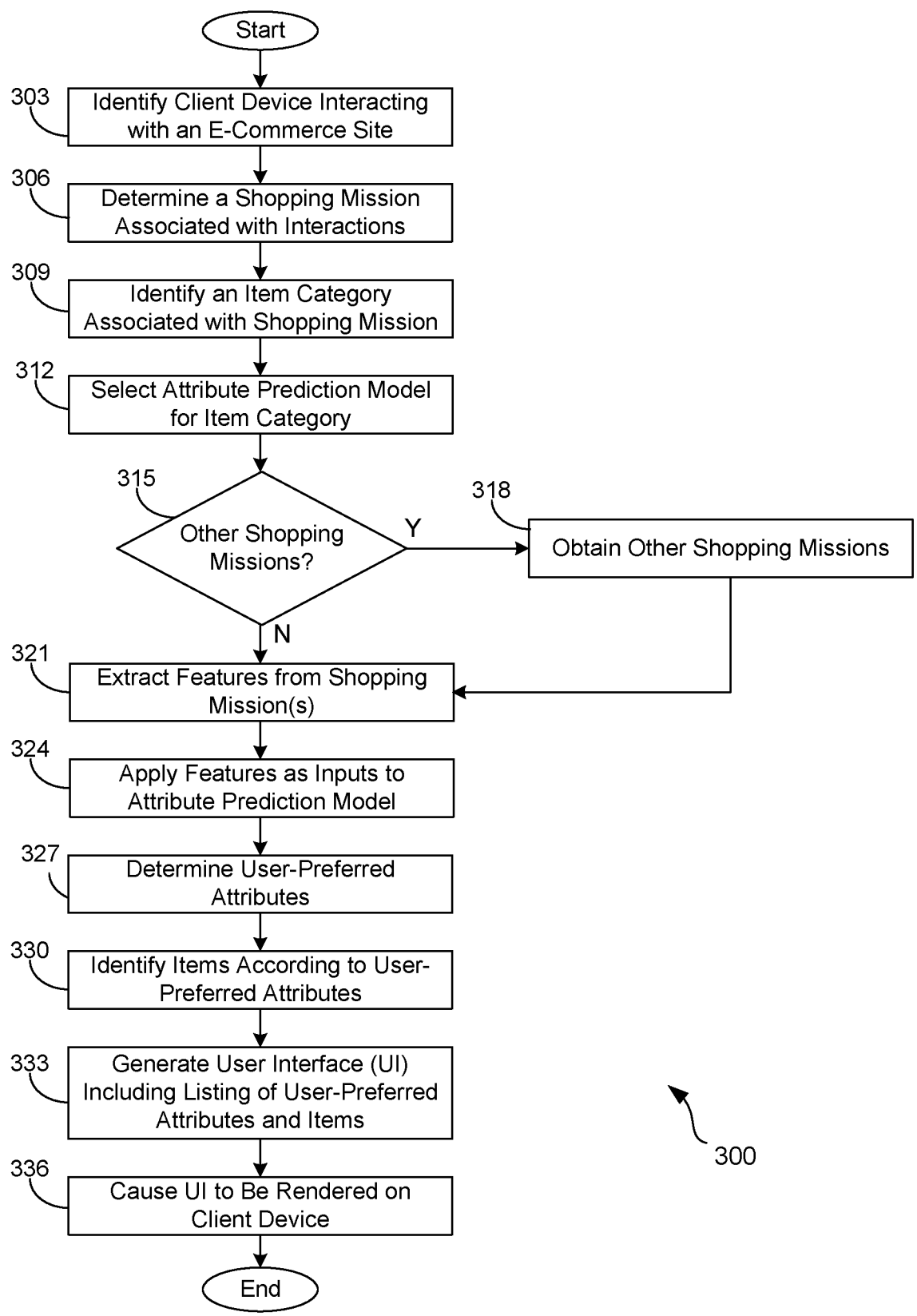
FIG. 3-7 are flowcharts illustrating examples of functionality implemented as portions of an electronic commerce application and a recommendation service executed in a computing environment in the networked environment of FIG. 2 according to one or more embodiments of the present disclosure.

Next, a general description of the operation of the one or more components of the networked environment 200 is provided with reference to FIGS. 3-7. To begin, FIG. 3 illustrates a flowchart 300 that provides one example of the operation of portions of the electronic commerce application 215 (FIG. 2) and the recommendation service 218 (FIG. 2) according to one or more embodiments. It is understood that the flowchart 300 of FIG. 3 provides merely an example of the many different types of functional arrangements that may be employed to implement the operation of the portions of the electronic commerce application 215 and the recommendation service 218 as described herein. As an alternative, the flowchart 300 of FIG. 3 may be viewed as depicting an example of elements of a method implemented in the computing environment 203 (FIG. 2) according to one or more embodiments.

FIG. 3 provides a non-limiting example of the functionality that may be performed by the electronic commerce application 215 and the recommendation service 218 while a client device 206 (FIG. 2) associated with a user and/or user account is interacting with the electronic commerce site provide by the electronic commerce application 215. In particular, FIG. 3 provides a non-limiting example of detecting user-preferred item attributes 112 (FIG. 1) and presenting a user interface 103 (FIG. 1) generated to include selectable refinement components 109 (FIG. 1) corresponding to the user-preferred item attributes 112 and item listings 106 (FIG. 1) arranged according to a relevance to the user-preferred item attributes 112.

Beginning with box 303, the electronic commerce application 215 identifies a client device 206 interacting with an electronic commerce site provided by the electronic commerce application 215. For example, assume the electronic commerce application 215 receives a request to view a user interface 103 associated with an electronic commerce site provided by the electronic commerce application 215. In this example, the user interface 103 comprises an item detail page, a search results page, and/or any other type of user interface 103. In some examples, the client device 206 is associated with a user having a user account with the electronic commerce application 215. In other examples, the client device 206 is associated with a user that does not have a user account with the electronic commerce application 215.

At box 306, the recommendation service 218 determines a current shopping mission 115 (FIG. 1) associated with the interactions. The current shopping mission 115 corresponds to an incomplete shopping mission 115 associated with the client device 206 currently interacting with electronic commerce application 215. The current shopping mission 115 is determined in response to detecting a sequence of interaction events (e.g., item views, item searches, item purchases, item clicks, etc.) that are clustered for a given item category. For example, the recommendation service 218 determines a current shopping mission 115 associated with "end tables" in response to determining that the interaction events associated with the interactions all correspond with the item category of "end tables."

At box 309, the recommendation service 218 identifies an item category associated with the shopping mission 115. In particular, when determining the shopping mission 115, the recommendation service 218 identifies the item category associated with the interaction events associated with the interactions that make up the shopping mission 115.

At box 312, the recommendation service 218 obtains an attribute prediction model 118 (FIG. 1) associated with the item category from the data store 212 (FIG. 2). The attribute prediction model 118 obtained from the data store 212 has been previously trained to detect user-preferred item attributes 112 based at least in part on the event features of one or more shopping missions 115. In some examples, the attribute prediction model 118 is only trained for the given item category. In other examples, the attribute prediction model 118 is trained for multiple item categories.

At box 315, the recommendation service 218 determines whether other shopping missions 115 are associated with the user and item category. For example, if a user has a user account and/or can be identified as having previously interacted with the electronic commerce application with respect to items included in the same item category, the interaction history data 236 (FIG. 2) and/or mission data 239 (FIG. 2) associated with the given user and/or user account indicates additional shopping missions 115. If there are other shopping missions 115, the recommendation service 218 proceeds to box 318 to obtain the other shopping missions 115 from the interaction history data 236 and/or mission data 239. Otherwise, the recommendation service 218 proceeds to box 321.

At box 321, the recommendation service 218 extracts the event features from the shopping mission(s) 115. The event features include, for example, one or more search query events, one or more item selection events, one or more item purchase event, an elapsed time associated with the respective shopping mission, a respective mission type (e.g., complete or incomplete), an item category, one or more attributes extracted from a search query (e.g., "red" and "running" from search for "red running shoes"), one or more item attributes, and/or other types of features. In some examples, the recommendation service 218 derives additional features from the event features including, for example, one or more identifications of events within shopping missions with multiple item views, item title attributes of items within one or more complete or incomplete shopping missions, search attributes of search queries within one or more complete or incomplete shopping missions, an item category associated with the mission(s) 115, and/or other features.

At box 324, the recommendation service 218 applies the event features as inputs to the attribute prediction model 118. The attribute prediction model 118 is trained to detect user-preferred attributes 112 according to likelihood that the user will purchase and/or click on an item that includes the particular item attribute. In particular, given the attribute information from the interaction events (e.g., search events, view events, click events, etc.) appearing in incomplete mission m up to a point in time, $T_t$, classifiers of the attribute prediction model 118 are trained to predict the probability of a target attribute, a, appearing in an interaction event in a time window after $T_t$ (e.g., the next interaction event in m). The attribute recommendation task then involves coming up with a user-preferred attribute ranking for the next event in mission m.

At box 327, the recommendation service 218 determines the user-preferred attributes 112 obtained from an output of the attribute prediction model 118. In particular, the attribute prediction model 118 returns a list of user-preferred attributes 112 determined according to the analysis of the event features associated with the shopping mission 115. In addition, each user-preferred item attribute 112 is assigned a probability associated with a likelihood that a purchase or click of an item including that user-preferred attribute 112 will occur as a future event during the current shopping mission 115.

At box 330, the recommendation service 218 identifies items to recommend according to the user-preferred attributes 112 obtained from the attribute prediction model 118. In some examples, one or more items associated with particular interactions are obtained through one or more data sources. For example, assume that the user has entered a search query and the search results from the search query include one or more items. In another example, assume a user requests to view an item detail page for a given item and one or more items that are considered to be similar to the given item may be obtained. According to one or more embodiments, upon identifying the user-preferred attributes 112, these items are ranked or re-ranked according to whether the items include any one of the user-preferred attributes 112. As such, in some examples, the recommendation service 218 selects and/or otherwise identifies items determined to be presented to the user based at least in part on whether the item includes any item attributes 244 that correspond to any one of the user-preferred attributes 112.

At box 333, the electronic commerce application 215 generates a user interface 103 including a listing of the user-preferred attributes and the item listings 106 corresponding to the items. In particular, the electronic commerce application 215 generates a user interface including selectable refinement components 109 (FIG. 1) corresponding to the detected user-preferred item attributes 112. In some examples, the selectable refinement components 109 are arranged according to the likelihood that the user will purchase or click on an item listing 106 for an item including the user-preferred attribute 112 during future events of the current shopping mission 115. The selectable refinement components 109 are configured such that, upon user selection of a particular selectable refinement component 109, the user interface 103 is modified to refine the listing of items presented in the user interface according to the user-preferred attribute 112 corresponding to the particular selectable refinement component 109.

At box 336, the electronic commerce application 215 causes the user interface 103 to be rendered on the client device 206. In one or more examples, the electronic commerce application 215 transmits user interface code that is executable by the client application 253 (FIG. 2) to generate and render the user interface 103 on the client device 206. In other examples, the electronic commerce application 215 transmits the generated user interface 103 to the client device 206 for rendering. For example, the electronic commerce application 215 sends data associated with the generated user interface 103 in response to an application programming interface (API) call from the client application 253. Thereafter, this portion of the process proceeds to completion.

Figure 4:
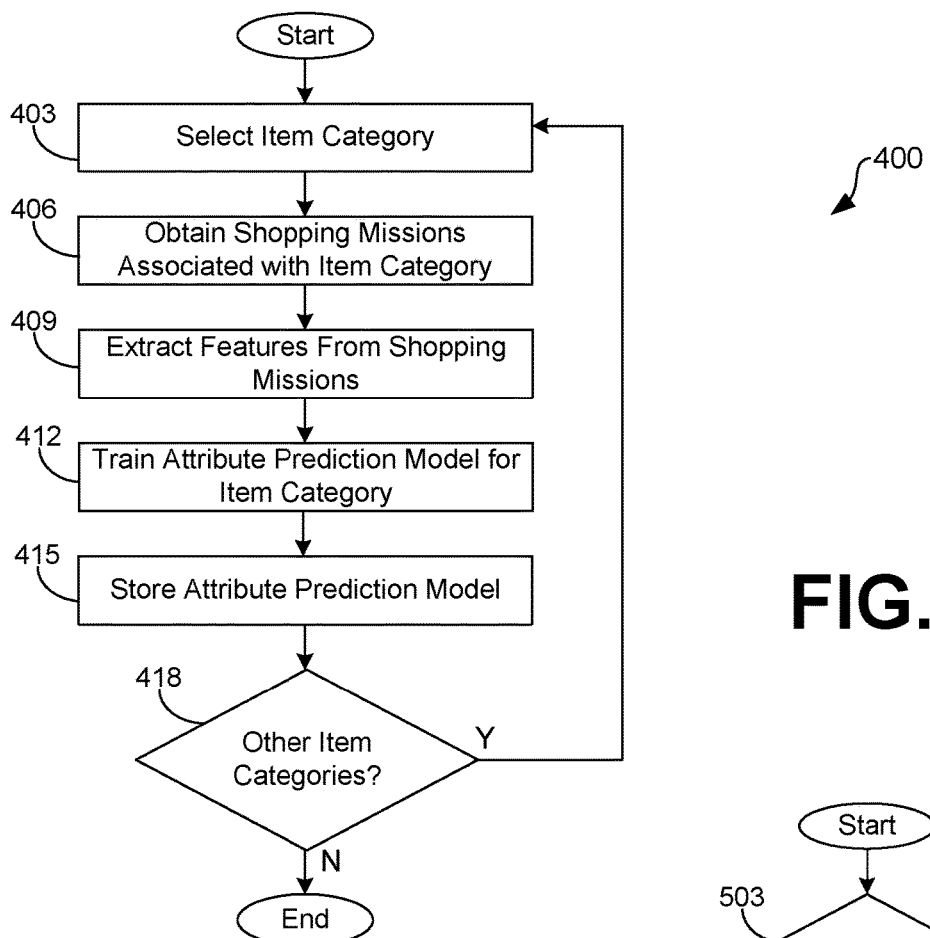

Turning now to FIG. 4, shown is a flowchart 400 that provides one example of the operation of portion of the recommendation service 218 (FIG. 2) according to one or more embodiments. It is understood that the flowchart 400 of FIG. 4 provides merely an example of the many different types of functional arrangements that may be employed to implement the operation of the portion of the recommendation service 218 as described herein. As an alternative, the flowchart 400 of FIG. 4 may be viewed as depicting an example of elements of a method implemented in the computing environment 203 (FIG. 2) according to one or more embodiments. FIG. 4 provides a non-limiting example of the functionality that may be performed by the recommendation service 218 to train the attribute prediction models 118 (FIG. 1) for each item category.

At box 403, the recommendation service 218 selects an item category from item categories associated with the item catalog 224 (FIG. 2). According to various embodiments, each item category corresponds to a particular level of the taxonomy within the item catalog 224. In this case, the item category is selected according to the particular level category. According to one or more examples, the item category is selected randomly, according to an alphabetic ordering of item category titles, according to a numeric ordering of item category identifiers, according to a location within the taxonomy, and/or other factors. In some examples, the item category is selected when a number of associated shopping missions 115 (FIG. 1) meets or exceeds a pre-defined number of shopping missions 115 required for training.

According to various examples, the attribute prediction models 118 (FIG. 1) are trained for a particular item category as different item categories include different dictionaries of attributes required to train the attribute prediction model 118. This condition further influences the level within the taxonomy associated with the selected item category. For example, while "clothing" may correspond to an item category, the recommendation service 218 may select an item category from a sub-category to clothing (e.g., Women's Dresses, Men's Dress Shirts) as the attribute dictionaries associated with the sub-categories differ.

At box 406, the recommendation service 218 obtains shopping missions 115 associated with the selected item category. A shopping mission is a sequence of interaction events (e.g., item views, item searches, item purchases, item clicks, etc.) that are clustered for a given item category. The shopping mission data is obtained from the mission data 239 (FIG. 2) and/or interaction history data 236 (FIG. 2) associated with the user data 221 (FIG. 2) of one or more user accounts of the electronic commerce site.

At box 409, the recommendation service 218 extracts event features from the shopping missions 115 to use as inputs for training the attribute prediction model 118. According to some embodiments, the event features include one or more search query events, one or more item selection events, one or more item purchase events, an elapsed time associated with the shopping mission, a mission type (e.g., complete or incomplete), an item category, one or more attributes extracted from a search query, one or more item attributes, and/or other types of features. In some examples, the recommendation service 218 derives additional features from the event features including, for example, one or more identifications of events within shopping missions with multiple item views, item title attributes of items within one or more complete or incomplete shopping missions, search attributes of search queries within one or more complete or incomplete shopping missions, an item category associated with the mission(s) 115, and/or other features.

At box 412, the recommendation service 218 trains the attribute prediction model 118 for the selected item category. As discussed, the attribute prediction model 118 corresponds to a supervised learning approach to finding attribute preferences in response to being provided incomplete mission data (purchase, view and search query data) up to a point in time for a given product type, classifiers are learned to predict the probability of the user interacting with (e.g., purchasing or clicking) a particular item through an attribute click in a time window after the time point.

During the training phase, for each mission $m_i$, a feature vector, $x_i=\phi(m_i)$, where $x_i$ is a dense representation of $m_i$, according to the user behavior before $T_t$ (e.g., point of time associated with events in mission). According to various embodiments, function corresponds to a feed-forward neural network, a label-specific neural network, and/or other classifier or network as can be desired.

Since a future event can have multiple attributes $a_i \in Y$, where Y is the label vector, $a_i=1$ if the mission event after $T_t$ contains $a_i$, otherwise $a_i=0$. $M=\{(x_i, y_i)\}_{i=1}^{N}$ denotes the set of user incomplete missions, which comprise N missions with corresponding labels $Y=\{y_i \in \{0,1\}^l\}$, where l is the total number of labels. A probabilistic multi-label classifier, F, is learned and the classification prediction probabilities are used as the ranking score for each attribute in Y.

$$\text{AttributeScore}(m_i, a_i) = \Gamma(x_i) \quad (1)$$

The multi-label classifier is constructed using fully connected layers. In some embodiments, Rectified Linear Unit (RELU) is a non-linear activation function that is used. The sigmoid function is used to transfer the output value into a probability. In the multi-label setting, the model is jointly learning on binary classifier per attribute label. Therefore, the sigmoid activation is applied in each output unit, rather than SoftMax activation used in multi-class classification.

As the classification probability is used as the ranking score for the attributes, in one or more embodiments, the binary cross entropy loss function is used to optimize for classification probabilities falling into each class. The cross-entropy loss is given by:

$$\mathcal{L} = -\sum_{i=1}^{N}\sum_{j=1}^{l} (1-y_{ij})\log(1-\hat{y}_{ij}) + y_{ij}\log(\hat{y}_{ij}) \quad (2)$$

where $y_{ij} \in [0,1]$ indicates the ground truth of the i-th example along the j-th label, $\hat{y}_{ij} \in [0,1]$ is the predicted probability, N is the number of training examples (e.g., shopping missions 115) and l is the number of labels (e.g., attributes 112).

According to various embodiments, attributes appearing in past behavior are viewed as input features while the attributes of future actions are viewed as prediction targets. It is important to note that the recurring attribute patterns as observed through a user's views and queries evolve over time and can change due to change in personal preferences and external stock availability, better value alternatives etc. As a result, the attribute prediction model 118 is trained to adapt to evolving user behavior. If a user shopping for a new coffee table is initially interested in "rustic" styling, but then begins to explore "modern" tables, the attribute, prediction model 118 is trained to immediately adapt to the change in attribute preferences.

It should be noted that while the attribute prediction model 118 has been discussed as a feed-forward neural network or a label-specific attention network, in some embodiments, the attribute prediction model 118 comprises other supervised machine learning models such as, for example, a logistic regression classifier, a random forest classifier; a decision tree classifier, a XGBoost classifier, a multi-layer perceptron classifier, a recurrent neural network, and/or any other type of trained model as can be appreciated.

At box 415, the recommendation service 218 stores the trained attribute prediction model 118 in the data store 212 in association with the item category. In some embodiments, the attribute prediction model 118 is mapped to an item category identifier associated with the item category.

At box 418, the recommendation service 218 determines if there are other item categories. If there are other item categories in which an attribute prediction model 118 has not yet been trained, the recommendation service 218 returns to box 403. Otherwise, the portion of the process proceeds to completion.

It should be noted that while the discussion of FIG. 4 corresponds to training an attribute prediction model 118 for a given item category, in some examples, the item category is not specifically identified and is rather an event feature that is extracted from the shopping missions that are used in training as discussed in reference to boxes 409 and 412 of FIG. 4. In these examples, the training of the attribute prediction model 118 considers and identifies the item category based on the inputs used to train the attribute prediction model 118.

Figure 5:
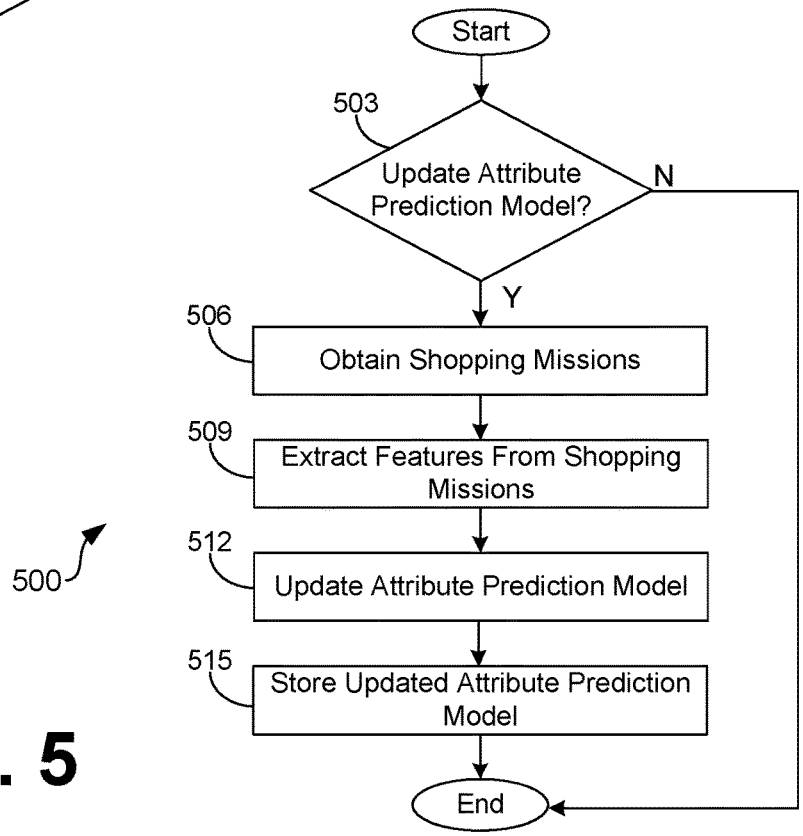

Turning now to FIG. 5, shown is a flowchart 500 that provides one example of the operation of portion of the recommendation service 218 (FIG. 2) according to one or more embodiments. It is understood that the flowchart 500 of FIG. 5 provides merely an example of the many different types of functional arrangements that may be employed to implement the operation of the portion of the recommendation service 218 as described herein. As an alternative, the flowchart 500 of FIG. 5 may be viewed as depicting an example of elements of a method implemented in the computing environment 203 (FIG. 2) according to one or more embodiments. FIG. 5 provides a non-limiting example of the functionality that may be performed by the recommendation service 218 to update the attribute prediction models 118 (FIG. 1) for a given item category.

At box 503, the recommendation service 218 determines whether an attribute prediction model 118 (FIG. 1) requires an update. In one or more embodiments, an attribute prediction model 118 is be updated periodically, according to a predefined schedule, randomly, upon a detection of outdated shopping missions 115 (FIG. 1), and/or other factors. If the recommendation service 218 determines that the attribute prediction model 118 requires an update, the recommendation service 218 proceeds to box 506. Otherwise, this portion of the process proceeds to completion.

At box 506, the recommendation service 218 obtains historical shopping missions 115. In some examples, the historical shopping missions 115 correspond to a given item category. In other examples, the historical shopping missions 115 are not specific to a particular item category. The shopping mission data is obtained from the mission data 239 (FIG. 2) and/or interaction history data 236 (FIG. 2) associated with the user data 221 (FIG. 2) of one or more user accounts of the electronic commerce site.

At box 509, the recommendation service 218 extracts event features from the shopping missions 115 to use as inputs for training the attribute prediction model 118. In one or more embodiments, the event features include, for example, one or more search query events, one or more item selection events, one or more item purchase events, an elapsed time associated with the shopping mission, a mission type (e.g., complete or incomplete), an item category, one or more attributes extracted from a search query, one or more item attributes, and/or other types of features. In some examples, the recommendation service 218 derives additional features from the event features including, for example, one or more identifications of events within shopping missions with multiple item views, item title attributes of items within one or more complete or incomplete shopping missions, search attributes of search queries within one or more complete or incomplete shopping missions, an item category associated with the mission(s) 115, and/or other features.

At box 512, the recommendation service 218 updates the attribute prediction model 118. For example, the recommendation service 218 retrains the attribute prediction model 118 following the steps discussed with respect to box 412 of FIG. 4.

At box 515, the recommendation service 218 stores the trained attribute prediction model 118 in the data store 212 (FIG. 2). In one or more examples, the attribute prediction model 118 is mapped to an item category identifier associated with a given item category. Thereafter, this portion of the process proceeds to completion.

Figure 6:
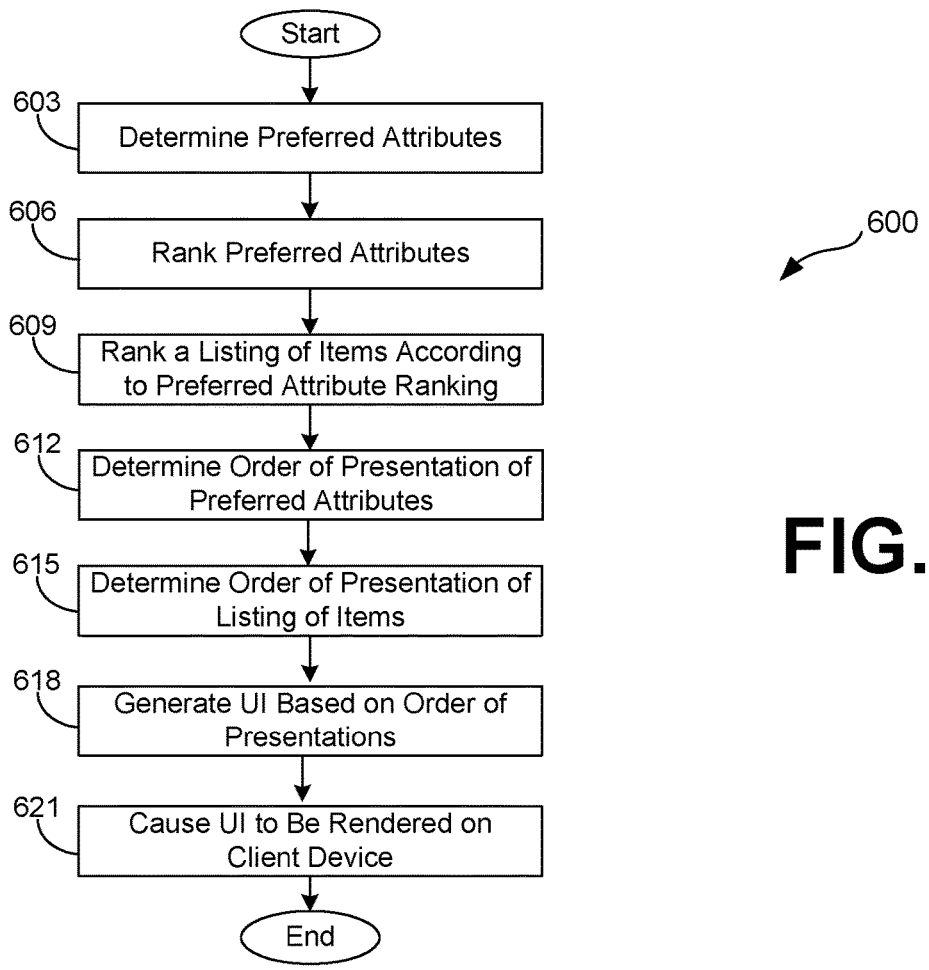

Turning now to FIG. 6, shown is a flowchart 600 that provides one example of the operation of portion of the recommendation service 218 (FIG. 2) according to one or more embodiments. It is understood that the flowchart 600 of FIG. 6 provides merely an example of the many different types of functional arrangements that may be employed to implement the operation of the portion of the recommendation service 218 as described herein. As an alternative, the flowchart 600 of FIG. 6 may be viewed as depicting an example of elements of a method implemented in the computing environment 203 (FIG. 2) according to one or more embodiments. FIG. 6 provides a non-limiting example of the functionality that may be performed by the electronic commerce application 215 and the recommendation service 218 to determine the order of presentation of the recommended attributes 112 (FIG. 1) and items to present to the user.

At box 603, the recommendation service 218 determines the user-preferred item attributes 112 obtained from the output of the attribute prediction model 118 (FIG. 1). In particular, features from the current shopping mission 115 and prior shopping missions 115, if available, are used as inputs for the attribute prediction model 118. The attribute prediction model 118 returns a listing of the user-preferred attributes 112 along with a respective estimated likelihood that a purchase or click of an item having the respective attribute will occur during the current interactive session.

At box 606, the recommendation service 218 ranks the user-preferred item attributes 112. In particular, each user-preferred item attribute 112 returned from the attribute prediction model 118 corresponds to a probability or otherwise estimated likelihood that a purchase or click of an item having the respective attribute will occur during the current interactive session. The recommendation service 218 ranks the user-preferred item attributes 112 according to the corresponding probability. In some examples, the attribute prediction model 118 ranks the user-preferred item attributes 112 prior to returning an output to the recommendation service 218.

At box 609, the recommendation service 218 ranks a listing of items associated with an item recommendation pool (e.g., search results in response to a search query, similar items of an item presented in an item detail page, etc.) according to whether the items include any one of the user-preferred attributes 112 provided from the attribute prediction model 118. In one or more examples, the recommendation service 218 assigns a score to each item that is calculated according to a number of item attributes 244 included in the item. In some examples, a weight is assigned to each of the user-preferred item attributes 112 according to the ranking of the user-preferred item attribute 112 such that a higher-ranked user-preferred item attribute 112 is assigned a higher weight than a lower-ranked user-preferred item attribute 112. As such, the score is based on a sum of the weights for item attributes 244 included in a particular item that match the user-preferred item attributes 112. The listing of items is then ranked according to the score.

At box 612, the recommendation service 218 determines an order of presentation of the user-preferred item attributes 112. In one or more embodiments, this order is based on the ranking associated with the user-preferred item attributes 112. At box 615, the order of presentation of the listing of items is according to the ranking associated the listing of items.

At box 618, the electronic commerce application 215 generates a user interface 103 including the listing of the user-preferred attributes 112 and the item listings 106 (FIG. 1) corresponding to the items. The listing of user-preferred attributes and the item listings 106 are both arranged according to the respective order of presentations. In particular, the electronic commerce application 215 generates a user interface including selectable refinement components 109 (FIG. 1) corresponding to the detected user-preferred attributes 112. The selectable refinement components 109 are arranged according to the likelihood that the user will purchase or click on an item listing 106 for an item including the user-preferred attribute 112. The selectable refinement components 109 are configured such that, upon user selection of a particular selectable refinement component 109, the user interface 103 is modified to refine the listing of items presented in the user interface according to the user-preferred attribute 112 corresponding to the particular selectable refinement component 109. Similarly, the item listings 106 are arranged in the user interface 103 such that the item listings 106 estimated to be of greatest interest to the user according to the user-preferred item attributes 112 are arranged higher than those estimated to be of lower interest to the user.

At box 621, the electronic commerce application 215 causes the user interface to be rendered on the client device 206. In one or more examples, the electronic commerce application 215 transmits user interface code that is executable by the client application 253 (FIG. 2) to generate and render the user interface 103 on the client device 206. In other examples, the electronic commerce application 215 transmits the generated user interface 103 to the client device 206 for rendering. For example, the electronic commerce application sends data associated with the generated user interface 103 in response to an application programming interface (API) call from the client application 253. Thereafter, this portion of the process proceeds to completion.

Figure 7:
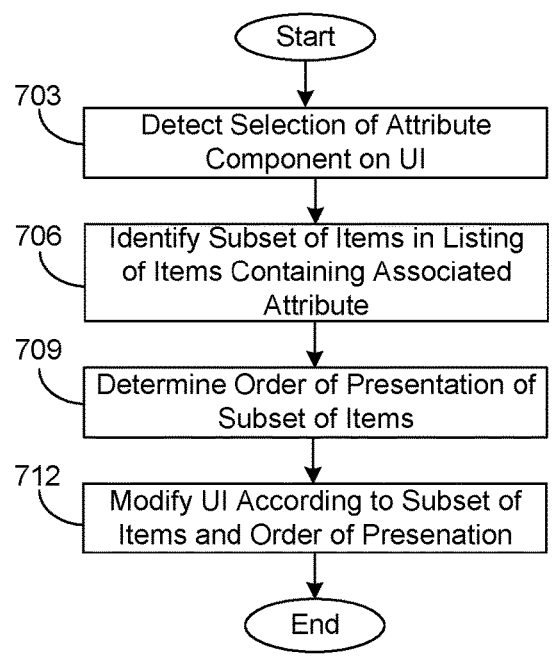

FIG. 7 illustrates a flowchart 700 that provides one example of the operation of portions of the electronic commerce application 215 (FIG. 2) and the recommendation service 218 (FIG. 2) according to one or more embodiments. It is understood that the flowchart 700 of FIG. 7 provides merely an example of the many different types of functional arrangements that may be employed to implement the operation of the portions of the electronic commerce application 215 and the recommendation service 218 as described herein. As an alternative, the flowchart 700 of FIG. 7 may be viewed as depicting an example of elements of a method implemented in the computing environment 203 (FIG. 2) according to one or more embodiments.

FIG. 7 provides a non-limiting example of the functionality that is performed by the electronic commerce application 215 in response to a user interacting with the selectable refinement components 109 (FIG. 1) included in the user interface 103 (FIG. 1).

At box 703, the electronic commerce application 215 detects a selection of a particular selectable refinement component 109 on a user interface 103. Using the example user interface 103 of FIG. 1, the electronic commerce application 215 can determine through data received from the client device 206 (FIG. 2) that the selectable refinement component 109b corresponding to the user-preferred item attribute 112 for "green" was selected.

At box 706, the electronic commerce application 215 identifies a subset of items in the listing of items in the user interface 103 that include a selected item attribute 244. For example, using the example in FIG. 1 and the discussion in box 703, the subset of items may include items that include "green" as an item attribute 244 (FIG. 2). For example, the electronic commerce application 215 may determine that item listings 106a, 106c, and 106f all correspond to items with the item attribute 244 of "green." As such, the electronic commerce application 215 selects the items that include the corresponding attribute 244. In some examples, the subset of items may not include items that match one or more of selected refinement attributes. For example, if the user had previously selected "green" and "v-neck," the subset of items may include items that include attributes similar to "green" or "v-neck" (e.g., turquoise, teal, square neck, low cut, etc.).

At box 708, the recommendation service 218 determines the order of presentation for the subset of items. In some examples, as the shopping mission 115 has expanded due to the selection of the particular selectable refinement component 109, the recommendation service 218 applies the expanded shopping mission 115 to the attribute prediction model 118 for the item category and obtains an updated listing of user-preferred item attributes 112. According to one or more examples, the order of presentation for the subset of items is determined by ranking the listing of items included in the subset of items according to whether the items include any one of the user-preferred attributes 112 provided from the attribute prediction model 118.

At box 712, the electronic commerce application 215 modifies the user interface 103 according to the subset of items and order of presentation. In particular, the modification corresponds to a refinement of items presented based at least in part on the user-preferred item attribute 112 that corresponds to the selected selectable refinement component 109. If any of the subset of items are not an identical match to the item attributes 112 selected by the user, in some examples, the user interface 103 is modified to include an indication that a particular item listing 106 corresponds to an item that is not an exact match. For example, the item listing 106 may include an indication that the dress is teal and not green. Thereafter, this portion of the process proceeds to completion.

Figure 8:
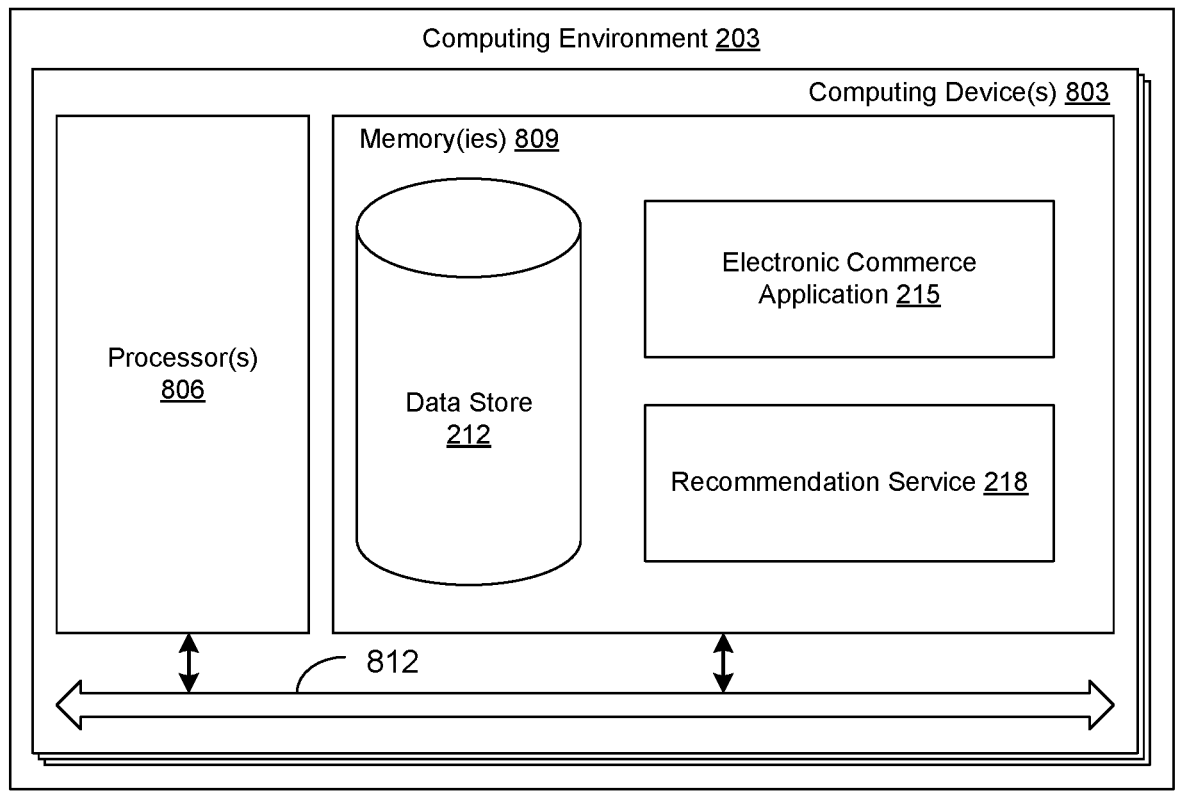
FIG. 8 is a schematic block diagram that provides one example illustration of a computing environment employed in the networked environment of FIG. 2 according to various embodiments of the present disclosure.

With reference to FIG. 8, shown is a schematic block diagram of the computing environment 203 according to an embodiment of the present disclosure. The computing environment 203 includes one or more computing devices 803. Each computing device 803 includes at least one processor circuit, for example, having a processor 806 and a memory 809, both of which are in communication with a local interface 812. To this end, each computing device 803 comprises, for example, at least one server computer or like device. The local interface 812 comprises, for example, a data bus with an accompanying address/control bus or other bus structure as can be appreciated.

Stored in the memory 809 are both data and several components that are executable by the processor 806. In one embodiment, the memory 809 stores instructions that are executable by the processor 806 to implement the electronic commerce application 215, the recommendation service 218, and potentially other applications. Also, according to one or more examples, stored in the memory 809 is a data store 212 and other data. In addition, an operating system is stored in the memory 809 and executable by the processor 806.

It is understood that, in one or more examples, other applications are stored in the memory 809 and are executable by the processor 806 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 809 and are executable by the processor 806. In this respect, the term "executable" means a program file that is in a form that is ultimately run by the processor 806. Examples of executable programs included, for example, a compiled program that can be translated into machine code in a format that is loaded into a random access portion of the memory 809 and run by the processor 806, source code that is expressed in proper format such as object code that is capable of being loaded into a random access portion of the memory 809 and executed by the processor 806, or source code that is interpreted by another executable program to generate instructions in a random access portion of the memory 809 to be executed by the processor 806, etc. An executable program is stored in any portion or component of the memory 809 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 809 is defined herein as including both volatile and nonvolatile memory and data storage components. Volatile components are those that do not retain data values upon loss of power. Nonvolatile components are those that retain data upon a loss of power. Thus, the memory 809 comprises, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM comprises, for example, static random-access memory (SRAM), dynamic random-access memory (DRAM), or magnetic random-access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 806 may represent multiple processors 806 and/or multiple processor cores and the memory 809 may represent multiple memories 809 that operate in parallel processing circuits, respectively. In such a case, the local interface 812 may be an appropriate network that facilitates communication between any two of the multiple processors 806, between any processor 806 and any of the memories 809, or between any two of the memories 809, etc. The local interface 812 may comprise additional systems designed to coordinate this communication, including, for example, performing load balancing. The processor 806 may be of electrical or of some other available construction.

Although the electronic commerce application 215, the recommendation service 218, and other systems described herein may be embodied in software or code executed by general purpose hardware as discussed above, as an alternative the same may also be embodied in dedicated hardware or a combination of software/general purpose hardware and dedicated hardware. If embodied in dedicated hardware, each is implemented as a circuit or state machine that employs any one of or a combination of a number of technologies. These technologies include, but are not limited to, discrete logic circuits having logic gates for implementing logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 3-7 show the functionality and operation of an implementation of portions of the electronic commerce application 215 and the recommendation service 218. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 806 in a computer system or other system. The machine code may be converted from the source code, etc. If embodied in hardware, each block may represent a circuit or a number of interconnected circuits to implement the specified logical function(s).

Although the flowcharts of FIGS. 3-7 show a specific order of execution, it is understood that the order of execution may differ from that which is depicted. For example, the order of execution of two or more blocks may be scrambled relative to the order shown. Also, two or more blocks shown in succession in FIGS. 3-7 may be executed concurrently or with partial concurrence. Further, in some embodiments, one or more of the blocks shown in FIGS. 3-7 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, according to one or more embodiments any logic or application described herein, including the electronic commerce application 215 and the recommendation service 218, that comprises software or code is embodied in any non-transitory computer-readable medium for use by or in connection with an instruction execution system such as, for example, a processor 806 in a computer system or other system. In this sense, the logic comprises, for example, statements including instructions and declarations that can be fetched from the computer-readable medium and executed by the instruction execution system. In the context of the present disclosure, a "computer-readable medium" is any medium that contains, stores, or maintains the logic or application described herein for use by or in connection with the instruction execution system.

According to one or more examples, the computer-readable medium comprises any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random-access memory (RAM) including, for example, static random-access memory (SRAM) and dynamic random-access memory (DRAM), or magnetic random-access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the electronic commerce application 215 and the recommendation service 218, may be implemented and structured in a variety of ways. For example, in one or more embodiments, one or more applications described are implemented as modules or components of a single application. Further, in one or more embodiments, one or more applications described herein are executed in shared or separate computing devices or a combination thereof. For example, a plurality of the applications described herein execute in the same computing device 803, or in multiple computing devices 803 in the same computing environment 203.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:
1. A system, comprising:
at least one computing device; and
at least one application executable by the at least one computing device, wherein, when executed, the at least one application causes the at least one computing device to at least:
identify a current session associated with a user interacting with an electronic commerce site;
determine a current shopping mission based at least in part on one or more interactions by the user with the electronic commerce site during the session in response to detecting a sequence of interaction events in the current session;
identify an item category associated with the current shopping mission, the sequence of interaction events being clustered for the item category in the current shopping mission;
apply one or more event features of the current shopping mission to an attribute preference model trained for the item category;
determine one or more user-preferred item attributes associated with the current session based at least in part on an output of the attribute preference model, the one or more user-preferred item attributes being determined without a user identifying at least one of the one or more user-preferred item attributes;
identify a plurality of items to present during the current session based at least in part on the one or more user-preferred item attributes and the item category;
generate a user interface comprising one or more selectable refinement components corresponding to the one or more user-preferred item attributes and a plurality of item listings corresponding to the plurality of items; and
transmit the user interface to a client device associated with the user.

2. The system of claim 1, wherein, when executed, the at least one application further causes the at least one computing device to at least determine an order of presentation of the one or more user-preferred attributes based at least in part on a ranking of the one or more user-preferred attributes.

3. The system of claim 2, wherein, when executed, the at least one application further causes the at least one computing device to at least rank the one or more user-preferred attributes based at least in part on a respective likelihood of selection of an item having a respective user-preferred attribute of the one or more user-preferred attributes during one or more future events of the current shopping mission.

4. The system of claim 1, wherein, when executed, the at least one application further causes the at least one computing device to at least determine an order of presentation of the plurality of item listings based at least in part on a ranking of the one or more user-preferred attributes.

5. A method, comprising:
determining, by at least one computing device, a current shopping mission of a current user session including one or more interactions with an electronic commerce site in response to detecting a sequence of interaction events in the current session;
identifying, by at least one computing device, an item category associated with the current shopping mission of the current user session, the sequence of interaction events being clustered for the item category in the current shopping mission;
selecting, by the at least one computing device, an attribute prediction model based at least in part on the item category;
determining, by the at least one computing device, a plurality of predicted user-preferred item attributes for the current user session based at least in part on the item category and the selected attribute prediction model, the plurality of predicted user-preferred item attributes being determined without user identification in the current shopping mission; and
generating, by the at least one computing device, a user interface comprising one or more selectable refinement components corresponding to one or more of the plurality of predicted user-preferred item attributes and a listing of items associated with the item category and having one or more of the plurality of predicted user-preferred item attributes.

6. The method of claim 5, further comprising updating, by the at least one computing device, the user interface based at least in part on a selection of a particular selectable refinement component of the one or more of selectable refinement components, the user interface being updated to refine the listing of items according to a respective attribute associated with the particular selectable refinement component.

7. The method of claim 5, wherein the plurality of predicted user-preferred item attributes are further determined based at least in part on interaction history data of a user account with respect to the item category, the interaction history data being used as an input to the attribute prediction model.

8. The method of claim 5, wherein the attribute prediction model estimates a likelihood of an item containing a particular attribute being purchased during the current shopping mission.

9. The method of claim 5, further comprising:
identifying the listing of items from a pool of recommended items obtained in response to a user request received during the current user session; and
ranking the listing of items based at least in part on the plurality of predicted user-preferred item attributes.

10. The method of claim 9, wherein the user request corresponds to a search query, an item detail page request, a webpage request for a webpage that includes one or more recommended items, an electronic commerce site home page, or an order summary page.

11. The method of claim 5, wherein the attribute prediction model is selected from a plurality of attribute prediction models based at least in part on at least one of the current shopping mission or user interaction history.

12. The method of claim 5, wherein the current shopping mission corresponds to a sequence of events associated with the user account interacting with the electronic commerce site.

13. A system, comprising:
at least one computing device; and
at least one application executable in the at least one computing device, wherein when executed the at least one application causes the at least one computing device to at least:
identify a current session associated with a client device interacting with an electronic commerce site;
determining a current shopping mission in response to detecting a sequence of interaction events in the current session;
determine an item category associated with a current shopping mission of the client device interacting with the electronic commerce site, the sequence of interaction events being clustered for the item category in the current shopping mission;
identify one or more user-preferred attributes based at least in part on the current shopping mission and an attribute prediction model trained for the item category, the one or more user-preferred attributes being identified without a prior identification of at least one of the one or more user-preferred attributes; and
generate a user interface identifying the one or more user-preferred attributes and a listing of items presented in an order based at least in part on a ranking of the one or more user-preferred attributes.

14. The system of claim 13, wherein, when executed, the at least one application causes the at least one computing device to at least train the attribute prediction model based at least in part on a plurality of prior shopping missions.

15. The system of claim 14, wherein the plurality of prior shopping missions are associated with interaction history data obtained from a plurality of client devices interacting with the electronic commerce site.

16. The system of claim 14, wherein the plurality of prior shopping missions comprises at least one of a complete shopping mission or an incomplete shopping mission.

17. The system of claim 14, wherein the plurality of prior shopping missions comprises a first plurality of shopping missions, when executed, the at least one application further causes the at least one computing device to at least update the attribute prediction model based at least in part on a second plurality of shopping missions.

18. The system of claim 13, wherein the attribute prediction model is updated periodically.

19. The system of claim 13, wherein the attribute prediction model determines the one or more user-preferred attributes based at least in part on a plurality of features associated with the current shopping mission.

20. The system of claim 19, wherein the plurality of features comprises at least one of a search query event, a number of events in the current shopping mission, an item selection event, an item purchase event, a time associated with the current shopping mission, a mission type, the item category, one or more item attributes extracted from a search query, or one or more item attributes.

* * * * *